United States Patent
Lee

[11] Patent Number: 6,069,710
[45] Date of Patent: May 30, 2000

[54] CIRCUIT AND METHOD FOR CONTROLLING PRINT HEADS OF INK-JET PRINTER

[75] Inventor: sung-hee Lee, Kyungki-do, Rep. of Korea

[73] Assignee: SamSung Electronics Co., Ltd., Suwon, Rep. of Korea

[21] Appl. No.: 08/997,620

[22] Filed: Dec. 23, 1997

[30] Foreign Application Priority Data

Dec. 23, 1996 [KR] Rep. of Korea ................... 96/70506

[51] Int. Cl.⁷ .............. B41B 15/00; B41J 2/145; B41J 2/175; B41J 29/38
[52] U.S. Cl. .............. 358/1.9; 358/1.9; 358/1.1; 358/1.5; 347/40; 347/87; 347/5; 346/140 R
[58] Field of Search ................... 395/108, 109, 395/101, 105; 347/40, 87, 5; 358/296; 346/140.1

[56] References Cited

U.S. PATENT DOCUMENTS

| | | | |
|---|---|---|---|
| 4,571,599 | 2/1986 | Rezanka | 347/87 |
| 4,965,593 | 10/1990 | Hickman | 347/12 |
| 4,969,758 | 11/1990 | Sanders, Jr. et al. | 347/12 |
| 5,349,375 | 9/1994 | Bolash et al. | 347/40 |
| 5,353,051 | 10/1994 | Katayama et al. | 347/12 |
| 5,369,428 | 11/1994 | Maze et al. | 347/5 |
| 5,671,002 | 9/1997 | Murano | 347/12 |
| 5,682,504 | 10/1997 | Kimura et al. | 347/12 |
| 5,692,108 | 11/1997 | Donahue | 347/12 |

*Primary Examiner*—Edward L. Coles
*Assistant Examiner*—Twyler Lamb
*Attorney, Agent, or Firm*—Robert E. Bushnell, Esq.

[57] ABSTRACT

A method for controlling the print heads of an ink-jet printer includes the steps of: setting a printing direction and a print head type; loading printing data; removing odd and even data bits from the loaded printing data; determining the set printing direction; transmitting odd data and then even data and latching the transmitted odd data and then latching the transmitted even data, when the determined printing direction is a first direction; transmitting the odd data and then the even data and latching the transmitted odd data and then latching the transmitted even data, when the determined printing direction is a second direction; storing the first-latched data when the head type is monochrome; storing the second-latched data when the head type is color; and generating print data according to the stored data. A circuit for achieving the method is also provided.

20 Claims, 5 Drawing Sheets

CIRCUIT AND METHOD FOR CONTROLLING PRINT HEADS OF INK-JET PRINTER

CLAIM OF PRIORITY

This application makes reference to, incorporates the same herein, and claims all benefits accruing under 35 U.S.C. §119 from my application entitled *Device and Method for Compensating for Distance Between Nozzles of Print Head* earlier filed with the Korean Industrial Property Office on Dec. 23, 1996 and there duly assigned Ser. No. 96-70506 by that Office.

BACKGROUND OF THE INVENTION

1. Field of the Invention

The present invention relates to ink-jet printers and, more specifically, to a circuit and method for controlling the print heads of an ink-jet printer, which processes print data through a single operation of memory accessing, by overcoming the distance between nozzle columns of a print head.

2. Discussion of Related Art

The print head of a typical ink-jet printer has a predetermined distance between odd-numbered and even-numbered nozzles in accordance with head type, i.e., color or monochrome, as shown in FIGS. 1A and 1B, respectively. That is, 18 nozzles are arranged in two columns on a nozzle plate 1*a* of a color print head, thus establishing a uniform distance L between columns of odd and even nozzles, while 56 nozzles are arranged in two columns on a nozzle plate 1*b* of a monochrome print head, thus establishing a uniform distance M between columns. Accordingly, during a printing operation, odd data and even data are read out of a memory with respect to the predetermined distance, L or M.

Referring to FIG. 2, a conventional circuit for controlling a print head to perform printing using the above nozzles comprises: a memory 101 for temporarily storing print data from a computer (not shown); a printer controller 102 for processing the stored print data and outputting print data suitable for a printing operation; a printer data separator 103 for separating the processed print data according to a separator select signal, to output odd nozzle data and even nozzle data; odd and even nozzle data latches 104 and 105 for latching the separated nozzle data according to latch signals applied from the printer controller 102 and thereby outputting odd data and even data, respectively; a print data control logic circuit 106 for outputting a next data request signal and outputting a print head control signal based on the separately output odd and even data, according to a fire strobe signal; a DMA/interrupt controller 107 for applying a direct memory access (DMA) or interrupt request signal to the printer controller 102 upon receiving the next data request signal; and a printer head 108 for performing a printing operation according to the print head control signal from the print data control logic circuit 106.

In the operation of the above print head controlling circuit, when a user executes a print program, the printer controller 102 temporarily stores print data in the memory 101 and processes the stored print data for output to the printer data separator 103. Here, odd data and even data are read from memory 101 according to the predetermined distance between the columns of odd and even nozzles, as shown in FIGS. 1A and 1B. In accordance with the printing direction, a DMA or interrupt request signal is applied from the DMA/interrupt controller 107 to the printer controller 102.

At this time, the printer controller 102 outputs the separator select signal to the printer data separator 103. A separator select signal for odd data means that the printer data separator 103 outputs odd nozzle data to the odd nozzle latch 104 which in turn supplies odd data to the print data control logic circuit 106. Thus, a print head control signal according to the applied odd data is generated according to the fire strobe signal and the next data request signal is supplied to the DMA/interrupt controller 107 which therefore outputs a DMA or interrupt request signal. This DMA or interrupt request signal, applied to the printer controller 102, results in a separator select signal corresponding to even data.

The even-data separator select signal is applied to the printer data separator 103 which in turn outputs even nozzle data to the even nozzle data latch 105. Similar to the case of the odd data, the print data control logic circuit 106 outputs a print head control signal according to the even data and the fire strobe output from the printer controller 102.

The printer head 108 then jets ink according to the applied print head control signal.

With the above described conventional print head controlling circuit, two DMA or interrupt request operations are needed for a single operation of data printing; i.e., first, for an odd nozzle data request, and, second, for an even nozzle data request. Such repeated processing necessitates a longer time for performing the printing operation. Furthermore, two channels of DMA or interrupt request should be provided for processing the head data, thus complicating the logic circuit.

SUMMARY OF THE INVENTION

An object of the present invention is to provide a method for controlling the print heads of an ink-jet printer, by overcoming the separation between nozzle columns, to thereby halve the number of DMA or interrupt request processes and shorten the print data processing time accordingly.

Another object of the present invention is to provide a method for controlling the print heads of an ink-jet printer, which enables a simplified logic circuit.

Yet another object of the present invention is to provide a circuit for achieving the above.

To achieve these and other advantages and in accordance with the purpose of the present invention, as embodied and broadly described, there is provided a circuit for controlling the print heads of an ink-jet printer device, comprising: a preceding latch for receiving preceding column nozzle data from a first multiplexer, receiving a printing data latch signal from a printer controller, and temporarily storing the preceding column nozzle data signal, the first multiplexer selectively outputting the data according to print direction; a following latch for receiving following column nozzle data from a second multiplexer, and temporarily storing the following column nozzle data according to the printing data latch signal supplied from the printer controller, the second multiplexer selectively outputting the data according to print direction; and a third multiplexer for receiving the following column nozzle data temporarily stored in the following latch section, receiving a head type select signal from the printer controller, and selectively outputting the following column nozzle data.

According to another aspect of the present invention, there is also provided a method for controlling the print heads of an ink-jet printer, comprising the steps of: setting a printing direction and a print head type; loading printing data; removing odd and even data bits from the loaded printing data; determining the set printing direction; transmitting odd data and then even data and latching the transmitted odd data and then latching the transmitted even data, when the determined printing direction is a first direction; transmitting the odd data and then the even data and latching the transmitted odd data and then latching the transmitted even data, when the determined printing direction is a second direction; storing the first-latched data when the head type is monochrome; storing the second-latched data when the head type is color; and generating print data according to the stored data.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1B:
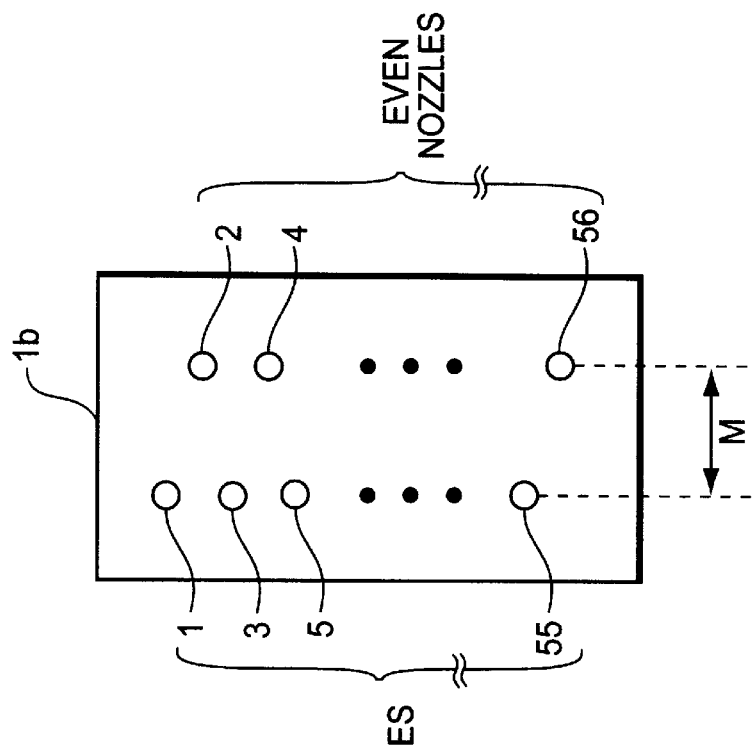
FIGS. 1A and 1B show a nozzle configuration of a typical ink-jet printer using color and monochrome print heads.
Figure 1A:
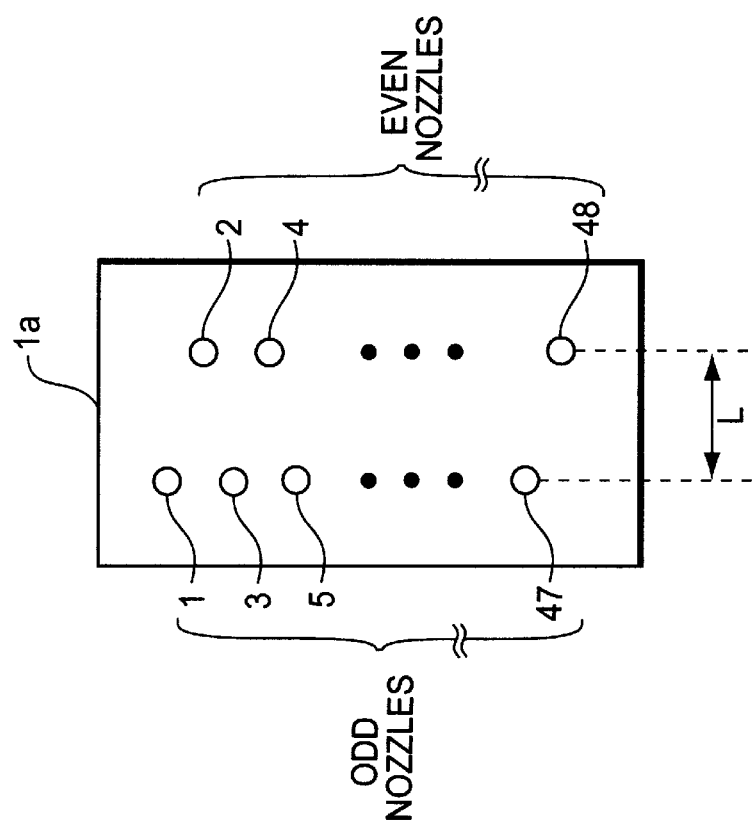
Figure 2:
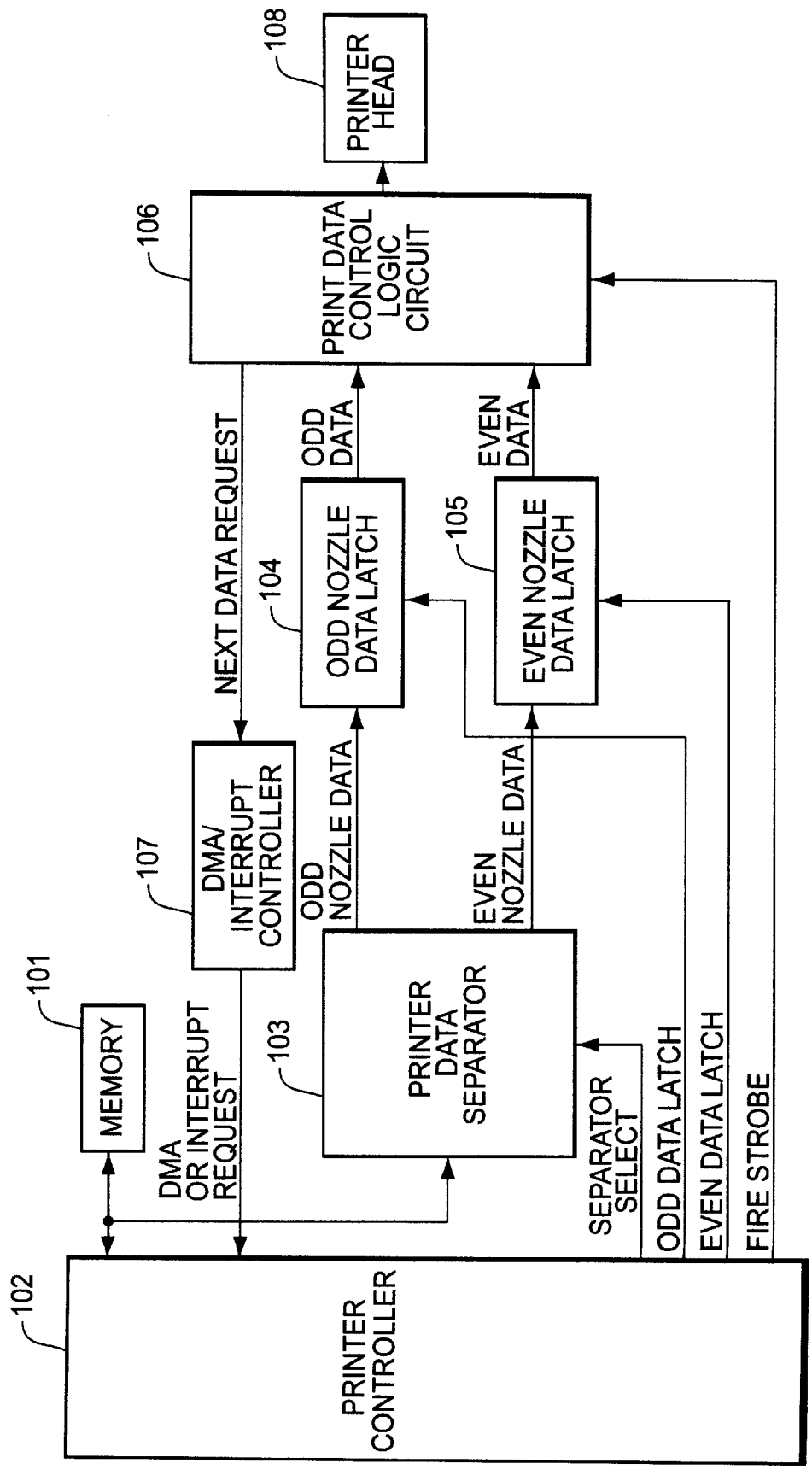
FIG. 2 is a block diagram of a conventional print head controlling circuit which performs printing operation using the nozzles of FIG. 1.
Figure 3A:
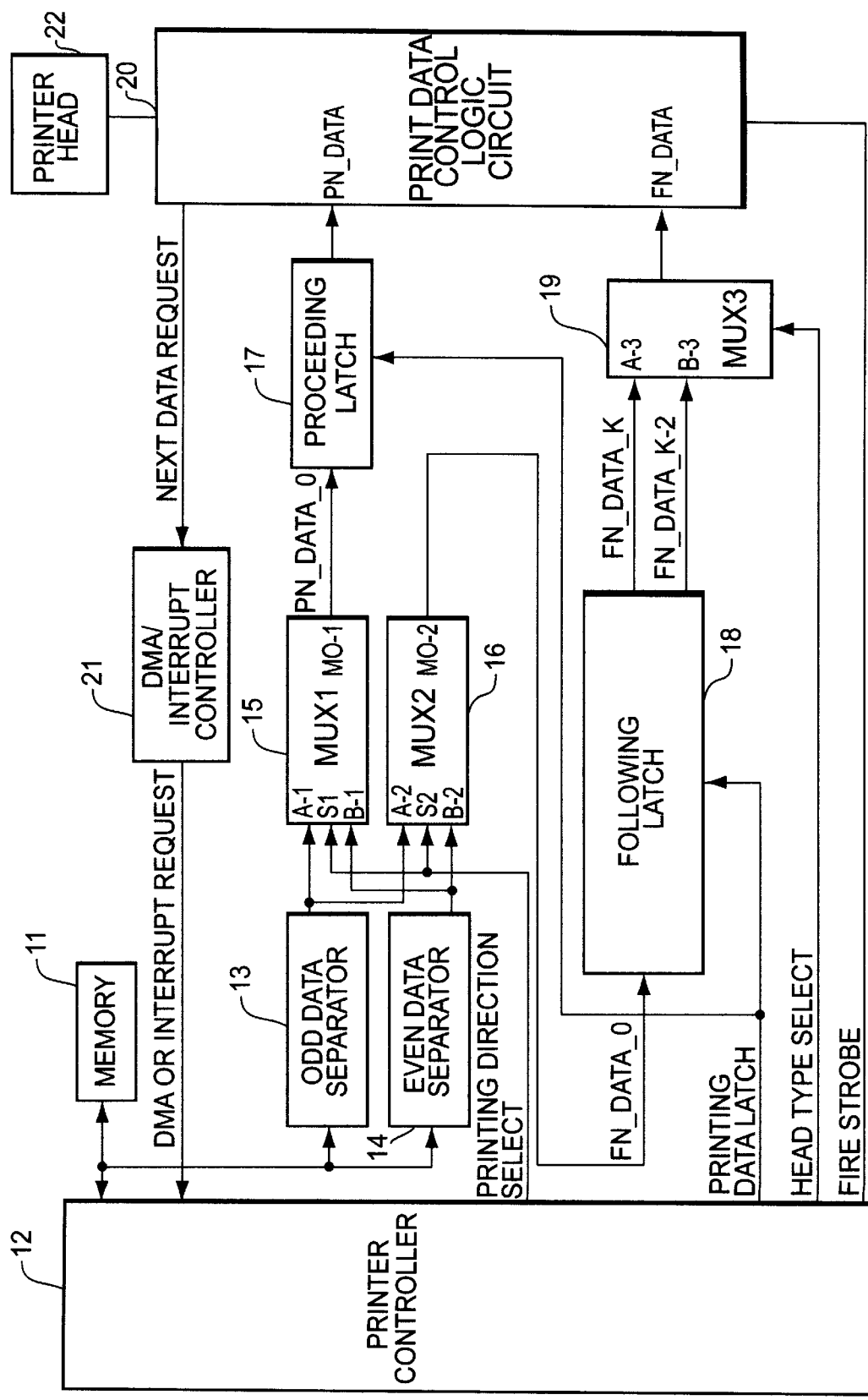
FIG. 3A is a block diagram of a circuit for controlling a print head according to the present invention.
Figure 3B:
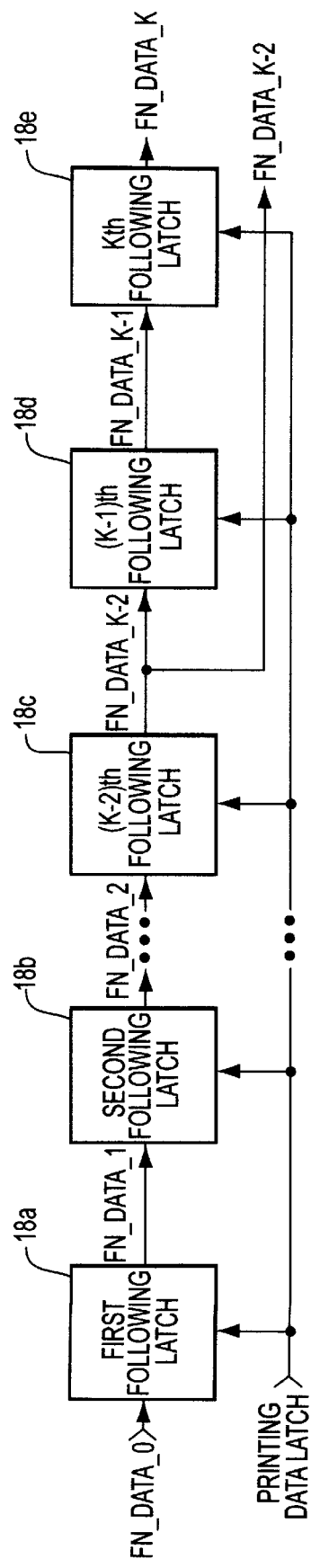
FIG. 3B is a detailed block diagram of the following latch of FIG. 3A.

Referring to FIGS. 3A and 3B, showing the configuration of a circuit for controlling the print heads of an ink-jet printer according to the present invention, the circuit comprises: a memory 11 for temporarily storing print data supplied from a computer (not shown); a printer controller 12 for reading and processing the stored print data, and outputting various data signal and control signal; odd and even data separators 13 and 14 for separating the odd data and even data, respectively, from the print data of the print controller 12; a first multiplexer 15 for receiving the odd data or even data respectively applied from the odd or even data separator 13 or 14 and selectively outputting preceding column nozzle data according to a printing direction select signal; a second multiplexer 16 for receiving the odd data or even data respectively applied from the odd or even data separator 13 or 14 and selectively outputting following column nozzle data according to the printing direction signal; a preceding latch 17 for latching the preceding column nozzle data according to a printing data latch signal; a following latch 18 for latching the following column nozzle data according to the printing data latch signal; a third multiplexer 19 for selectively outputting the latched following column nozzle data according to a head type select signal; a print data control logic circuit 20 for outputting a print head control signal based on the multiplexed following column nozzle data and the latched preceding column nozzle data and outputting a next data request signal; a DMA/interrupt controller 21 for outputting a DMA or interrupt request signal upon receipt of the next data request signal; and a printer head 22 for performing a printing operation by jetting ink according to the print head control signal and thereby forming an image on print media with the ink. The following latch 18 is comprised of first through Kth following latches 18a–18e, as shown in FIG. 3B.

In the operation of the above circuit, when a user executes a print program using a computer, print data is generated and transmitted to the printer controller 12 and temporarily stored in the memory 11. The printer controller 12 reads the stored print data and processes it into data suitable for printing. The print data output from the printer controller 12 assumes no distance between nozzle columns.

The processed data is then transmitted to the odd and even data separators 13 and 14, where it is separated into odd and even data, respectively, and output. The odd data is applied to terminals A-1 and A-2 of the first and second multiplexers 15 and 16, while the even data is applied to terminals B-1 and B-2 thereof. Each of multiplexers 15 and 16 receives the printing direction select signal through its selection terminal S1 or S2 and outputs a column of nozzle data through its output terminal MO-1 and MO-2 according to the printing direction select signal. Here, the first multiplexer 15 outputs preceding column nozzle data and the second multiplexer 16 outputs following column nozzle data.

The column nozzle data output through first and second multiplexers 15 and 16 is output such that the preceding and following nozzle data are continuous. That is, when the printing direction select signal corresponds to a first direction, e.g., from left to right, the even data is applied to the preceding latch 17 and the odd data is applied to the following latch 18; and when the printing direction select signal corresponds to a second direction, the odd data is applied to the preceding latch 17 and the even data is applied to the following latch 18.

The preceding latch 17, to which the preceding column nozzle data PN_Data_0 from the first multiplexer 15 is applied, temporarily stores (latches) the applied data and then sends it on to the print data control logic circuit 20 to output a print head control signal.

The following latch 18, to which the following column nozzle data FN Data 0 is applied from the second multiplexer 16, is composed of a series of latches according to the distance between nozzle columns. The first following latch 18a, to which the following column nozzle data DN_Data_0 is applied, outputs following column nozzle data DN_Data_1 to the second following latch 18b. The second following latch 18b temporarily stores following column nozzle data FN_Data_1 and outputs following column nozzle data FN_Data_2. In turn, the serially latched data is applied to the (K-2)th following latch 18c. Accordingly, following column nozzle data FN_Data_2 is applied to an input terminal D 3 of the third multiplexer 19 and to the (K-1)th following latch 18d which temporarily stores it and then outputs following column nozzle data FN_Data_1 to the Kth following latch 18e. The Kth following latch 18e temporarily stores following column nozzle data FN_Data_K-1 and then outputs following column nozzle data FN_Data_K to an input terminal A-3 of the third multiplexer 19. Here, each latch of the following latch 18 receives the printing data latch signal from the printer controller 12 and outputs temporarily stored data.

As described above, the following latch 18, constructed of a series of latches according to the predetermined distance between nozzle columns, generates the first latched signal according to the printing data latch signal upon output of the fire strobe signal by the printer controller 12. Accordingly, following column nozzle data FN_Data_K is transmitted, and successively, next following column nozzle data FN Data K-1 is transmitted.

The third multiplexer 19 responds to the print head type signal supplied from the printer controller 12, to output following column nozzle data. Since the distance between nozzle columns varies with head type, the third multiplexer 19 outputs the following column nozzle data according to the fire strobe signal, depending on the print head type select signal.

The preceding column nozzle data and following column nozzle data, respectively supplied from the preceding latch 17 and third multiplexer 19, are respectively applied to input terminals PN_Data and FN_Data of the print data control logic circuit 20. The print data control logic circuit 20 then outputs the print head control signal corresponding to the preceding column nozzle data and following column nozzle data, according to the fire strobe signal. The print head control signal is input to the printer head 22 which performs a corresponding printing operation.

The print data control logic circuit 20 outputs the next data request signal for requesting the next preceding column nozzle data and the next following column nozzle data. The next data request signal is sent to the DMA/interrupt controller 21 which outputs a DMA or interrupt request signal according to the next data request signal. The DMA or interrupt request signal is applied to the print controller 12 which outputs next print data accordingly.

Therefore, as described above, after cone column of data is printed, the DMA or interrupt request signal is used only once for requesting the next column print data.

Figure 4:
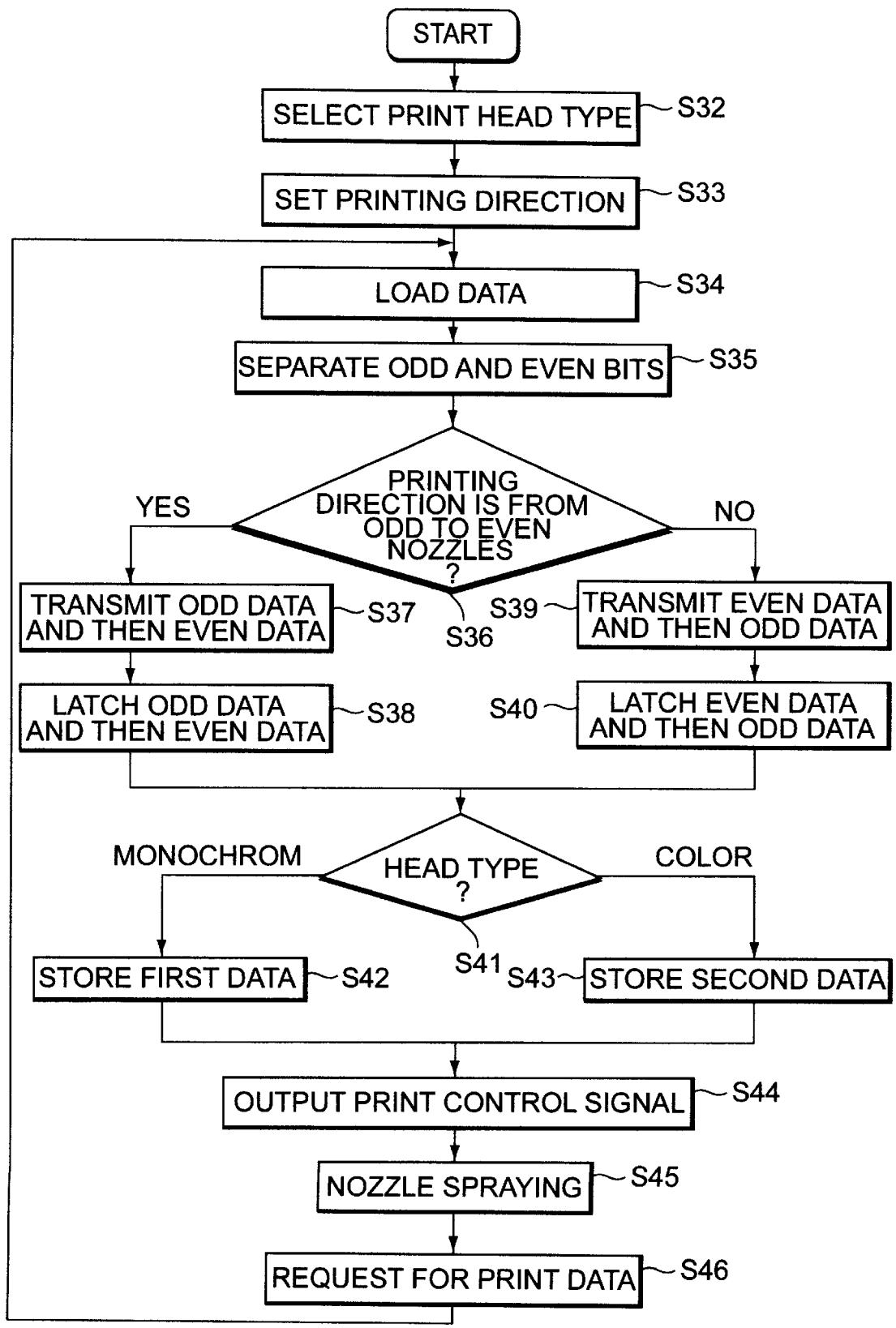
FIG. 4 is a flow diagram showing a method for controlling a print head according to the present invention.

In FIG. 4, showing a method for controlling the print hands of an ink-jet printer according to the present invention, the method includes: a step S32 for selecting a print head type; a step S32 for setting a printing direction; a step S34 for loading print data; a step S35 for separating odd and even data bits; a step S36 for determining whether the set printing direction is from odd nozzles to even nozzles; a step S37 for transmitting odd data and then even data when the printing direction is from odd to even nozzles; a step S38 for latching the odd data and then the even data; a step S39 for transmitting odd data and then even data when the printing direction is from even to odd nozzles; a step S40 for latching the odd data and then the even data; a step S41 for determining whether the selected head type is monochrome; a step S42 for storing the first-latched data when the print head type is monochrome; a step S43 for storing the second latched data when the head type is color; a step S44 for controlling print data according to the stored data, to generate a print control signal; a step S45 for jetting ink through the nozzles; and a step S46 for requesting next print data.

In the above method, when a program for selecting a print head type is executed, the print head type is selected (S32) and a printing direction is set (S33). Once the print head type and printing direction are determined, the printer controller 12 is requested to load printing data (S34), upon which the odd and even data separators 13 and 14 separate the off and even bits from among the loaded printing data (S35). With the odd and even bits thus separated, the selected printing direction is determined (S36). At this time, either one of two processes is performed; that is, either the transmission and latching of the odd data is carried out first, followed by the even data, or the transmission and latching of the even data is carried out first, followed by the odd data (S37–S40). Here, the odd and even data are temporarily stored in the preceding latch 17 and following latch 18. Next, the head type is determined (S41). If the head type is monochrome, following column nozzle data FN Data K is applied to input terminal FN_Data of the print data control logic circuit 20 (S42). Otherwise, if the head type is color, following column nozzle data FN Data K-2 is applied to input terminal FH_Data of the print data control logic circuit 20 (S43). Upon the receiving of following column nozzle data, the print data logic circuit 20 generates the print control signal according to the following column nozzle data input (S44). Then, the printer head 22 carries out printing (S46).

As described above, the present invention processes data to be printed through a one-time memory accessing, without regard to the distance between odd nozzles and even nozzles, to reduce the data processing time and increase the printing speed. Furthermore, the circuit configuration is simplified, resulting in improved system efficiency and lower manufacturing cost.

It will be apparent to those skilled in the art that various modifications can be made in the circuit and method for controlling the print heads of an ink-jet printer of the present invention, without departing from the spirit of the invention. Thus, it is intended that the present invention cover such modifications as well as variations thereof, within the scope of the appended claims and their equivalents.

What is claimed is:

1. A circuit for controlling the print heads of an ink jet printer apparatus, comprising:

a first plurality of ink jet nozzles aligned in a first column for recording print data on a recordable medium;

a second plurality of ink jet nozzles aligned in a second column for recording said print data on the recordable medium, said first and second columns separated by a distance;

a plurality of terminals, comprising:

a first one of said terminals disposed to receive a first control signal controlling latching of said print data;

a second one of said terminals disposed to receive a second control signal corresponding to one of a first and second print direction;

a third one of said terminals disposed to receive a first data signal comprising a first section of said print data, corresponding to said first plurality of ink jet nozzles; and a fourth one of said terminals disposed to receive a second data signal comprising a second section of said print data not including said first section, corresponding to said second plurality of ink jet nozzles;

a first latch unit receiving a first selected signal from among said first and second data signals according to said second control signal, storing said first selected signal according to said first control signal;

a second latch unit receiving a second selected signal from among said first and second data signals according to said second control signal, and storing said second selected signal according to said first control signal;

a control unit generating one request signal, said one request signal requesting both said first and second sections of said print data;

a print head jetting ink through said first and second plurality of ink jet nozzles respectively corresponding to said first and second sections of said print data, said print head corresponding to a type of print head selected from among a monochrome print head type and a color print head type; and a multiplexer outputting one latched signal selected from a color latched signal and a monochrome latched signal in accordance with said type of print head, said plurality of latched signals corresponding to said second selected signal, said one latched signal being received from said second latch unit, said color latched signal being latched for a period of time corresponding to a first distance separating ink jet nozzles of said color print head type, said monochrome latched signal being latched for a period of time corresponding to a second distance separating ink jet nozzles of said monochrome print head type.

2. The circuit of claim 1, said first section of said print data corresponding to odd numbered ink jet nozzles and said second section of said print data corresponding to even numbered nozzles when said print head is transported in said first direction.

3. The circuit of claim 2, said first section of said print data corresponding to said even numbered ink jet nozzles and said second section of said print data corresponding to said odd numbered nozzles when said print head is transported in said second direction.

4. The circuit of claim 1, wherein said second latch unit comprises at least one latch, according to said distance between said columns of ink jet nozzles.

5. The circuit of claim 1, wherein said second latch unit comprises a plurality of latches, according to said distance between said columns of ink jet nozzles.

6. A method for controlling the print heads of an ink-jet printer, comprising the steps of:

setting a print head type to correspond to one of a monochrome print head type and a color print head type for recording print data on a recordable medium;

setting a printing direction for recording said print data on the recordable medium, said printing direction being selected from among a first and a second direction;

storing said print data in a memory;

removing first and second sections of said print data from said memory;

sensing the set printing direction;

latching said first section of said print data at a preceding latch and latching said second section of said print data at a following latch, when the sensed printing direction corresponds to said first direction;

latching said second section of said print data at said preceding latch and latching said first section of said print data at said following latch, when the sensed printing direction corresponds to said second direction;

outputting one latched signal selected from a plurality of latched signals in accordance with the set print head type, said plurality of latched signals corresponding to the section of said print data latched by said following latch, said one latched signal being output from said following latch;

generating one request signal, said one request signal requesting both said first and second sections of said print data; and generating processed data for printing according to said print data stored in said memory.

7. The method of claim 6, further comprising the steps of:

outputting first output data from said following latch when the set print head type corresponds to said monochrome print head, said first output data corresponding to a distance between ink jet nozzles of said monochrome print head; and outputting second output data from said following latch when the set print head type corresponds to said color print head, said second output data corresponding to a distance between ink jet nozzles of said color print head, said fist and second output data being selected from said output data.

8. A recording apparatus, comprising:

a monochrome type print head comprising first and second monochrome columns of nozzles separated by a first distance, recording monochrome data on a recordable medium and receiving a print command signal;

a color type print head comprising first and second color columns of nozzles separated by a second distance, recording color data on the recordable medium and receiving said print command signal;

a support unit repetitively transported across the recordable medium in a first print direction and an opposite second print direction, supporting said monochrome and color print heads;

a memory receiving, storing, and outputting print data;

an interrupt controller outputting one interrupt signal, said one interrupt signal requesting said print data corresponding to said first and second monochrome and color columns of nozzles;

a printer controller receiving said one interrupt signal from said interrupt controller and receiving said print data from said memory;

said printer controller outputting said print data, a print head type signal corresponding to one type selected from among said monochrome type print head and said color type print head, a print direction signal corresponding to one of said first and second print directions, a latch signal for controlling latching of data, and a first strobe signal;

a first data separator receiving said print data from said printer controller, separating a first data section from said print data corresponding to said first monochrome column and said first color column, and outputting said first data section;

a second data separator receiving said print data from said printer controller, separating a second data section from said print data corresponding to said second monochrome column and said second color column, and outputting said second data section;

a first multiplexer selectively receiving one of said first and second data sections according to said print direction signal, and outputting preceding column data;

a second multiplexer selectively receiving one of said first and second data sections according to said print direction signal, and outputting following column data;

a first latch unit receiving said preceding column data from said first multiplexer, temporarily latching said preceding column data according to said latch signal, and outputting said preceding column data;

a second latch unit comprising a plurality of latches corresponding to said first and second distances, receiving said following column data from said second multiplexer, temporarily latching said following column data according to said latch signal, outputting first following column data and outputting second following column data;

a third multiplexer receiving said first following column data and said second following column data from said second latch unit, and selectively outputting one of said first and second following column data according to said print head type signal;

a print data control circuit receiving said preceding column data from said first latch unit, receiving one of said first and second following column data from said third multiplexer according to said print head type signal, outputting a next data request signal, and outputting said print command signal corresponding to said preceding column data and one of said first and second following column data according to said fire strobe signal; and said interrupt controller receiving said next data request signal from said print data control circuit, said interrupt controller outputting one next request signal requesting next print data according to said next data request signal.

9. The recording apparatus of claim 8, wherein said second latch unit comprises a plurality of serially connected latches comprising:

a first latch receiving said following column data from said second multiplexer and outputting said following column data;

a first plurality of intermediate latches, receiving said following column data from said first latch and outputting said following column data;

a primary latch receiving said following column data from said first plurality of intermediate latches and outputting said first following column data to said third multiplexer;

a second plurality of intermediate latches, receiving the following column data from said primary latch and outputting said following column data; and a last latch receiving said following column data from said second plurality of intermediate latches and outputting said second following column data to said third multiplexer.

10. The recording apparatus of claim 8, wherein said second latch unit comprises:

a primary latch corresponding to said first distance separating said monochrome columns of nozzles, receiving said following column data, and outputting said first following column data to said third multiplexer; and a secondary latch corresponding to said second distance separating said color columns of nozzles, receiving said following column data from said primary latch, and outputting said second following column data to said third multiplexer.

11. The recording apparatus of claim 8, further comprising a second and third color print head supported by said supporting unit, each of said color print heads jetting a differently colored ink on the recordable medium.

12. The recording apparatus of claim 8, wherein said color print head jets three differently colored inks on the recordable medium.

13. The recording apparatus of claim 8, wherein said first color column of nozzles and said first monochrome column of nozzles correspond to odd-numbered nozzles.

14. The recording apparatus of claim 8, wherein said second color column of nozzles and said second monochrome column of nozzles correspond to even-numbered nozzles.

15. The recording apparatus of claim 8, wherein said third multiplexer outputs said first following column data when said print head type signal corresponds to monochrome print head and outputs said second column data when said print head type signal corresponds to color print head.

16. The recording apparatus of claim 8, wherein said preceding column data outputted by said first multiplexer corresponds to said first monochrome column of nozzles when said first monochrome column of nozzles is transported over the recordable medium prior to said second monochrome column of nozzles and said print data corresponds to said monochrome data.

17. A method for controlling print heads of an ink jet printer, comprising the steps of:

selecting one of a monochrome print head and a color print head, for recording print data on a recordable medium, said monochrome print head having first and second monochrome columns of nozzles separated by a first distance and said color print head having first and second color columns of nozzles separated by a second distance;

selecting one of a first print direction and a second print direction for transporting said selected print head across the recordable medium;

storing said print data in a memory;

outputting one interrupt signal, said one interrupt signal requesting said print data corresponding to said first and second monochrome and color columns of nozzles;

separating primary data from said print data corresponding to said first monochrome column of nozzles and said first color column of nozzles;

separating secondary data from said print data corresponding to said second monochrome column of nozzles and said second color column of nozzles;

when said selected print direction corresponds to said first print direction, transmitting said primary data and said secondary data, latching said primary data in a first latch unit and latching said secondary data in a second latch unit, transmitting said primary data to a print data control circuit, transmitting said secondary data from a first output terminal and from a second output terminal of said second latch unit respectively to a first input terminal and a second input terminal of a multiplexer;

when said selected print direction corresponds to said second print direction, transmitting said secondary data and said primary data, latching said secondary data in said first latch unit and latching said primary data in said second latch unit, transmitting said secondary data to said print data control circuit, transmitting said primary data from said first output terminal and from said second output terminal of said second latch unit respectively to said first input terminal and said second input terminal of said multiplexer;

when said selected print head corresponds to said monochrome print head, transmitting data received at said first input terminal of said multiplexer to said print data control circuit;

when said selected print head corresponds to said color print head, transmitting data received at said second input terminal of said multiplexer to said print data control circuit; and transmitting data received by said print data control to said selected print head.

18. The method of claim 17, wherein said data received at said first input terminal of said multiplexer corresponds to said first distance separating said first and second monochrome columns of nozzles of said monochrome print head.

19. The method of claim 17, wherein said data received at said second input terminal of said multiplexer corresponds to said second distance separating said first and second color columns of nozzles of said color print head.

20. The method of claim 19, said first color column of nozzles corresponding to odd numbered ink jet nozzles and said second color column of nozzles corresponding to even numbered ink jet nozzles.

* * * * *